(12) United States Patent
Mangano et al.

(10) Patent No.: US 7,925,803 B2
(45) Date of Patent: Apr. 12, 2011

(54) METHOD AND SYSTEMS FOR MESOCHRONOUS COMMUNICATIONS IN MULTIPLE CLOCK DOMAINS AND CORRESPONDING COMPUTER PROGRAM PRODUCT

(75) Inventors: Daniele Mangano, Messina (IT); Giuseppe Guarnaccia, Catania (IT); Carmelo Pistritto, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 209 days.

(21) Appl. No.: 12/191,792

(22) Filed: Aug. 14, 2008

(65) Prior Publication Data
US 2009/0049212 A1 Feb. 19, 2009

(30) Foreign Application Priority Data
Aug. 16, 2007 (EP) .................................. 07114463

(51) Int. Cl.
*G06F 5/00* (2006.01)
(52) U.S. Cl. .......................................... 710/52; 713/375
(58) Field of Classification Search .................. None
See application file for complete search history.

(56) References Cited

U.S. PATENT DOCUMENTS

| | | | |
|---|---|---|---|
| 6,078,962 A | 6/2000 | Chappel et al. | |
| 6,141,765 A * | 10/2000 | Sherman | 713/400 |
| 6,694,389 B2 * | 2/2004 | Coates et al. | 710/52 |
| 7,349,387 B2 * | 3/2008 | Wu | 370/360 |
| 7,363,526 B1 * | 4/2008 | Chong et al. | 713/401 |
| 7,383,459 B1 * | 6/2008 | Jones | 713/503 |
| 7,466,701 B2 * | 12/2008 | Mondinelli et al. | 370/389 |
| 7,568,118 B2 * | 7/2009 | Anderson et al. | 713/400 |
| 7,636,803 B2 * | 12/2009 | Williams et al. | 710/52 |
| 7,668,272 B1 * | 2/2010 | Obeidat | 375/354 |
| 7,676,685 B2 * | 3/2010 | Castano et al. | 713/600 |
| 7,684,534 B2 * | 3/2010 | Buchmann et al. | 375/376 |

(Continued)

FOREIGN PATENT DOCUMENTS

EP 0 228 811 A2 7/1987

(Continued)

OTHER PUBLICATIONS

Vivet, Design of On-Chip and Off-Chip Interfaces for a GALS NoC Architecture, 2006, IEEE, pp. 1-10.*

(Continued)

Primary Examiner — Cheng-Yuan Tseng
(74) Attorney, Agent, or Firm — Lisa K. Jorgenson; Timothy L. Boller; Seed IP Law Group PLLC

(57) ABSTRACT

Full-duplex communication over a communication link between an initiator operating with an initiator clock and a target operating with a target clock involves, in communication from the initiator to the target: storing data from the initiator in a first FIFO memory with the initiator clock, reading data from the initiator stored in the first FIFO memory, wherein reading is with the target clock transmitting the data read from the first FIFO memory over a first mesochronous link, and storing the data transmitted over the first mesochronous link in a buffer whereby the data are made available to the target. Communication from the target to the initiator includes: transmitting data from the target over a second mesochronous link, and storing the data transmitted over the second mesochronous link in a second FIFO memory, wherein storing is with the target clock, whereby the data are made available to the initiator for reading from the second FIFO memory with the initiator clock signal.

9 Claims, 6 Drawing Sheets

U.S. PATENT DOCUMENTS

| | | | |
|---|---|---|---|
| 7,689,856 B2 * | 3/2010 | Godiwala | 713/600 |
| 7,694,264 B2 * | 4/2010 | Warren | 716/14 |
| 2005/0281275 A1 * | 12/2005 | Haghighi | 370/401 |
| 2006/0203825 A1 * | 9/2006 | Beigne et al. | 370/395.42 |
| 2006/0209846 A1 * | 9/2006 | Clermidy et al. | 370/400 |
| 2006/0239392 A1 | 10/2006 | Cummings et al. | |
| 2007/0067514 A1 | 3/2007 | Anderson et al. | |
| 2007/0081414 A1 * | 4/2007 | Douady et al. | 365/233 |
| 2008/0005402 A1 * | 1/2008 | Kim et al. | 710/52 |
| 2008/0057896 A1 * | 3/2008 | Kim et al. | 455/187.1 |
| 2008/0061835 A1 | 3/2008 | Locatelli et al. | |
| 2008/0159454 A1 * | 7/2008 | Ye et al. | 375/354 |
| 2008/0215786 A1 * | 9/2008 | Goossens et al. | 710/243 |
| 2008/0276116 A1 * | 11/2008 | Bjerregaard | 713/501 |
| 2008/0294803 A1 | 11/2008 | Mangano et al. | |

FOREIGN PATENT DOCUMENTS

| | | |
|---|---|---|
| EP | 0 525 221 A1 | 2/1993 |
| EP | 1 901 474 A1 | 3/2008 |

OTHER PUBLICATIONS

Mangano, Effective full-duplex Mesochronous Link Architecture for Network-on-Chip Data-Link layer, 2007, IEEE, pp. 1-8.*

Mangano, D., et al., "Skew Insensitive Physical Links for Network on Chip," 2006 1st International Conference on Nano-Networks and Workshops, IEEE, 2006, pp. 129-133.

* cited by examiner

METHOD AND SYSTEMS FOR MESOCHRONOUS COMMUNICATIONS IN MULTIPLE CLOCK DOMAINS AND CORRESPONDING COMPUTER PROGRAM PRODUCT

TECHNICAL FIELD

The present disclosure generally relates to communication techniques, and was devised with special but not exclusive attention paid to its possible use in the System-on-Chip (SoC) interconnect domain.

BACKGROUND INFORMATION

Synchronizers or asynchronous links can be employed in order to cross clock boundaries in a chip with multiple clock domains.

Asynchronous circular FIFOs are generally used to guarantee high performance in terms of frequency and bandwidth. Such a kind of FIFO relies on the idea to write data in one clock domain and read them in a safe way in the other domain. The main idea is to synchronize the information about the pointers used to address the FIFO. These pointers are generated in one clock domain and latched in the other one. To avoid a wrong sampling of the pointer vector due to different wire delay of its bits, the pointer is usually Gray coded.

The synchronization techniques force to place together in the same physical cluster the Gray pointer generation logic clocked by the write clock domain, and the synchronization module, clocked by the receiving clock. This is done primarily to avoid large differences between the delays of the wires crossing the clock boundary. This also implies that the two clock domains have to be contiguous. As a consequence, clock domains generally have to span large regions of the chip respecting the maximum clock skew permitted by the clock tree. The balancing required on the clock tree to ensure the same phase in "remote" zones on the chip is a heavy task in Deep Sub-micron (DSM) technologies, and back-end teams have to spend a lot of time and effort to face the problem of the timing closure.

Current solutions to solve this issue are based either on this time consuming, difficult and not always possible task, or on using a different, safer 4-phases asynchronous communication. When the number of different clock domains increases, due to a large amount of IPs being present in the SoC, this first solution is no longer feasible, while the asynchronous approach based on 4-phases signaling protocol, introducing a heavy bandwidth limitation, does not permit to meet high performance requirements.

The problem in using synchronizers is that clock signals have to be distributed and balanced. Asynchronous links enable to overcome the above problem, but suffer from other serious problems: limited bandwidth, wire-overhead and complexity (area overhead).

European Patent Application No. 06291440 discloses a synchronization system for synchronizing modules in an integrated circuit including a so-called SKew Insensitive Link (SKIL) to implement a mesochronous mechanism (see also D. Mangano, et al.: "Skew Insensitive Physical Links for Network on Chip", 1st International Conference on Nano-Networks (NANO-NET 2006), Lausanne, Switzerland, 14-16 Sep. 2006).

As is well known, the term "mesochronous" denotes a relationship between two signals such that their corresponding significant instants occur at the same average rate. A mesochronous network is thus a network where the clocks run with the same frequency but unknown relative phases.

Additionally, European Patent Application No. 07108878 discloses a full-duplex mesochronous link.

BRIEF SUMMARY

The arrangements considered in the foregoing suffer from the inability to handle communications between different, remote clock domains in an efficient way.

This point may become particularly significant since future on-chip communication systems are expected to rely extensively on the Network on Chip (NoC) paradigm. The main building blocks of a Network on Chip (NoC) are the Network Interface (NI), the router and the link. The NI(s) provide the access point for the IPs, routers provide the actual data transport mechanism, and links are used to set up point-to-point interconnections. As indicated, NoCs are usually designed according to a Globally Asynchronous Locally Synchronous (GALS) approach: this means that multiple clock domains coexist, while routers are expected to work at the same clock frequency.

The need is therefore felt for arrangements that may allow communication between different far clock domains in a SoC, without clock balancing between any parts of the clusters and guaranteeing at the same time high performance.

One embodiment provides an effective response to those needs.

According to an embodiment, a method having the features described herein is provided. One embodiment also relates to corresponding systems (e.g., a link between an initiator and a target, and the initiator/target as inter-related entities) as well as a corresponding computer program product, loadable in the memory of at least one computer and including software code portions for performing the method when the product is run on a computer. As used herein, reference to such a computer program product is intended to be equivalent to reference to a computer-readable medium containing computer-readable instructions encoded or otherwise stored thereon that are executable by a processor for controlling a computer system to coordinate the performance of the method of one embodiment. Reference to "at least one computer" is evidently intended to highlight the possibility for one embodiment to be implemented in a distributed/modular fashion.

The claims are an integral part of the disclosure provided herein.

In an embodiment, the proposed solution permits the communication between different, remote clock domains in a SoC, without clock balancing between any parts of the clusters and guaranteeing at the same time high performances. This enables to drastically limit the clock region of the interconnection system in which balancing is required, relieving issues in the clock tree synthesize, with no bandwidth limitation and wire overhead. This may be significant with CMOS technology scaling, increasing complexity and wire-delay problem as this might imply that the on-chip communication system will limit more and more the overall SoC's performance, whereby solutions combining the Network on Chip paradigm and the GALS approach are emerging in order to overcome architectural and physical limitations.

An embodiment is based on an effective and quite simple implementation and can be built by using CMOS standard-cells.

In an embodiment, the particular mechanism implemented ensures that synchronization FIFOs are written and read in the same cluster, which is a condition guaranteeing high frequency operation when different clusters with long paths are used.

Various embodiments provide a number of features, e.g.:
- the possibility of performing synchronization between remote clock domains with no bandwidth limitation and wire overhead;
- an effective implementation (hardware resources sharing);
- the possibility for CMOS standard-cell implementation;
- the possibility of writing and reading synchronization FIFO in the same cluster.

In an embodiment, an effective solution for the physically decoupling of two clock domains is achieved by merging synchronization and mesochronous techniques; by combining a synchronizer and a mesochronous link, a sort of asynchronous link able to transfer information between two far clock domains is achieved. In particular, an embodiment, which may be termed a Clock Boundary Spreader (CBS), enables to implement optimized links particularly suitable to plug IPs in a NoC. The CBS is based on the idea to share some hardware resources between the mesochronous link and the synchronizer, such as used in the NoC. The response buffer for implementing the mesochronous mechanism is shared between the synchronizer and the mesochronous link. In addition, when interconnecting a NI to a Node, the request buffer for implementing the mesochronous mechanism can be optionally reused for implementing a store and forward mechanism and covering gaps in the traffic. When synchronization is performed, buffering is used to cover traffic gaps, and it is possible to share also some NoC resources.

In an embodiment, data is transmitted from a NI to a router by storing data to a first FIFO memory with the IP clock; then, data is read from the FIFO memory with the NoC clock, transmitted over a first mesochronous link and stored in a buffer, which proves the data to the router. Similarly, data is transmitted from a router to a NI by transmitting the data from the router directly over a second mesochronous link and storing the data to a second FIFO memory with the NoC clock. Then the NI might read the data from the second FIFO memory with the IP clock.

BRIEF DESCRIPTION OF THE SEVERAL VIEWS OF THE DRAWINGS

One or more embodiments will now be described, by way of example only, with reference to the enclosed figures of drawing, wherein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
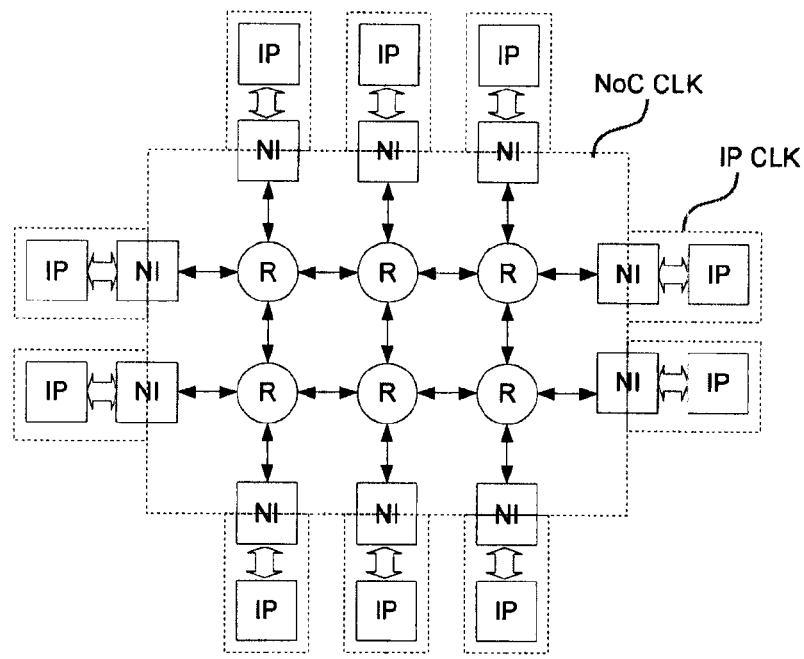
FIG. 1 is a functional block diagram of a NoC-based System-on-Chip of one embodiment.

FIG. 1 is a block schematic representation of an embodiment of a System-on-Chip (SoC) architecture based on the Network-on-Chip (NoC) paradigm.

The main building blocks of a Network-on-Chip arrangement are the Network Interfaces, the Routers and the links. In the block diagram of FIG. 1, the Network Interfaces and the Routers are denoted NI and R, respectively. The Network Interfaces provide access points for the various IP (Intellectual Property) cores—of any known type—while the routers R provide the actual data transport mechanism, and the links are used to set up point-to-point interconnections.

As indicated, NoCs are usually designed according to a Globally Asynchronous Locally Synchronous (GALS) approach. This means that multiple clock domains coexist, typically including an IP clock domain(s) designated as IP CLK, and a NoC clock domain, designated as NoC CLK, while the routers R are expected to work at the same clock frequency.

Usually, synchronous/asynchronous links connect the Network Interfaces NI with the routers R. In order to manage the IP clock domain(s) and the NoC clock domain at the clock boundary in the NI, usually a FIFO memory is used.

Figure 2:
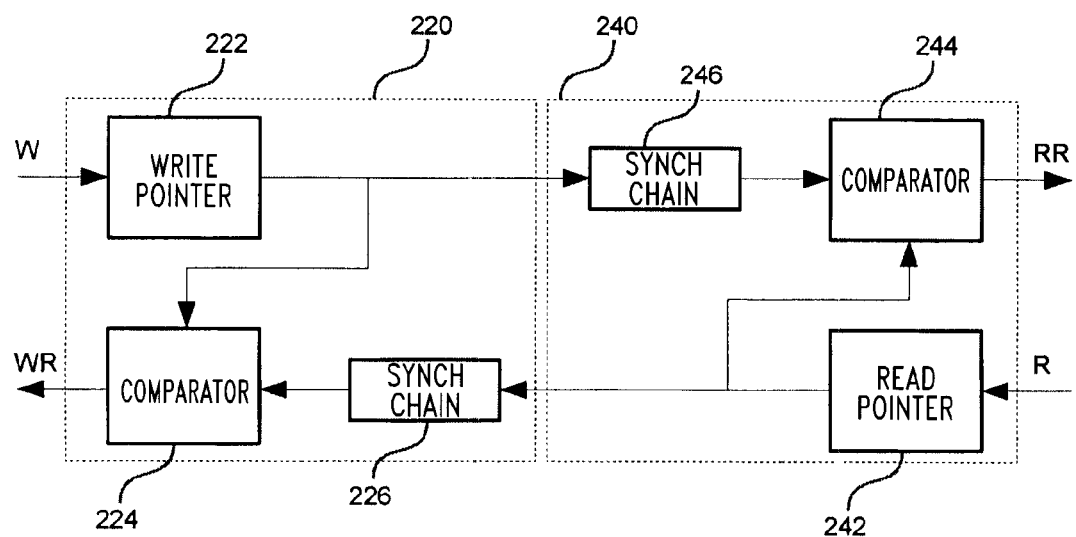
FIG. 2 shows a FIFO memory of one embodiment.

In that respect, FIG. 2 shows one embodiment of a FIFO memory control having a write interface 220 with a first clock signal and a read interface 240 with a second clock signal.

Typically, two pointers are used for managing the FIFO memory. A write pointer 222 indicates the next free memory location and a read pointer 242 indicates the next element to be read. Specifically, on a write request W, data is written to the next memory location and the write pointer 222 is incremented. Similarly, on a read request R, data are read from the FIFO memory and the next memory cell is selected.

For synchronization purposes, the most important signal are the signals WR and RR with indicate if a write or a read operation might be performed. In order to detect if the FIFO memory is ready, synchronization between the two clock domains has to be performed. In the exemplary FIFO memory, the write ready signal WR is generated by synchronizing the read pointer 242 with a synchronization chain 226, which relies in the write clock domain, and comparing with a comparator block 224 the result with the write pointer 222.

Similarly, the read ready signal RR is generated by synchronizing the write pointer 222 with a synchronization chain 246, which relies in the read clock domain, and comparing with a comparator block 244 the result with the read pointer 242. Any FIFO memory might be used. Specifically, in certain embodiments, signals such as BUSY, EMPTY and FULL might be used instead of the write and read ready signals WR and RR.

Figure 3:
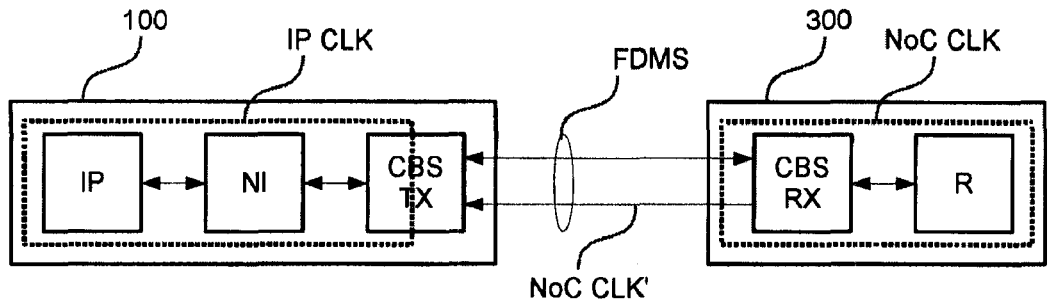
FIG. 3 shown an example application of one embodiment to a NoC-based System-on-Chip.

FIG. 3 shows a block diagram of a possible CBS application of one embodiment, such as the interconnection between an external generic IP and a Router R.

As mentioned in the foregoing with respect to FIG. 1, IPs are plugged into NoC by means of NIs, where generally synchronization is performed. In FIG. 3, a block CBS TX performs synchronization and manages a mesochronous communication. However, the operation of the CBS can be viewed as the cascade of a synchronizer, a mesochronous transmitter CBS TX, a full-duplex mesochronous link FDMS, and a mesochronous receiver CBS RX.

The IP is physically placed in a first cluster 100 together with the Network Interface NI. Both IP and NI belong to the first clock domain, i.e., the IP clock signal IP CLK.

Conversely, the router R is placed in a second cluster 300 with a second clock domain, i.e., the NoC clock signal NoC CLK.

The frequency conversion is performed in the cluster 100 by using the synchronizer between the IP clock and the NoC clock. Specifically the second clock signal at the CBS TX block is an unbalanced clock signal, i.e., NoC CLK' that is provided by the second cluster 300 via the mesochronous link FDMS.

Figure 4:
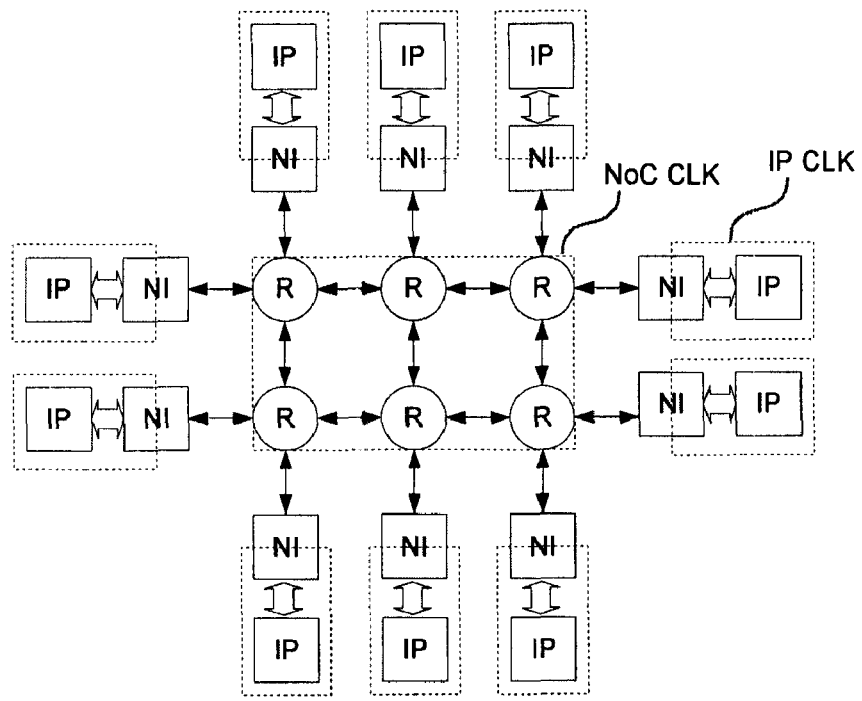
FIG. 4 is a functional block diagram of a NoC-based System-on-Chip in accordance with one embodiment.

FIG. 4, shows how this approach impacts on the NoC architecture of one embodiment. Specifically the NoC clock domain does not extend anymore to the NI, because a mesochronous link is used between the routers R and the network interfaces NI.

Figure 5:
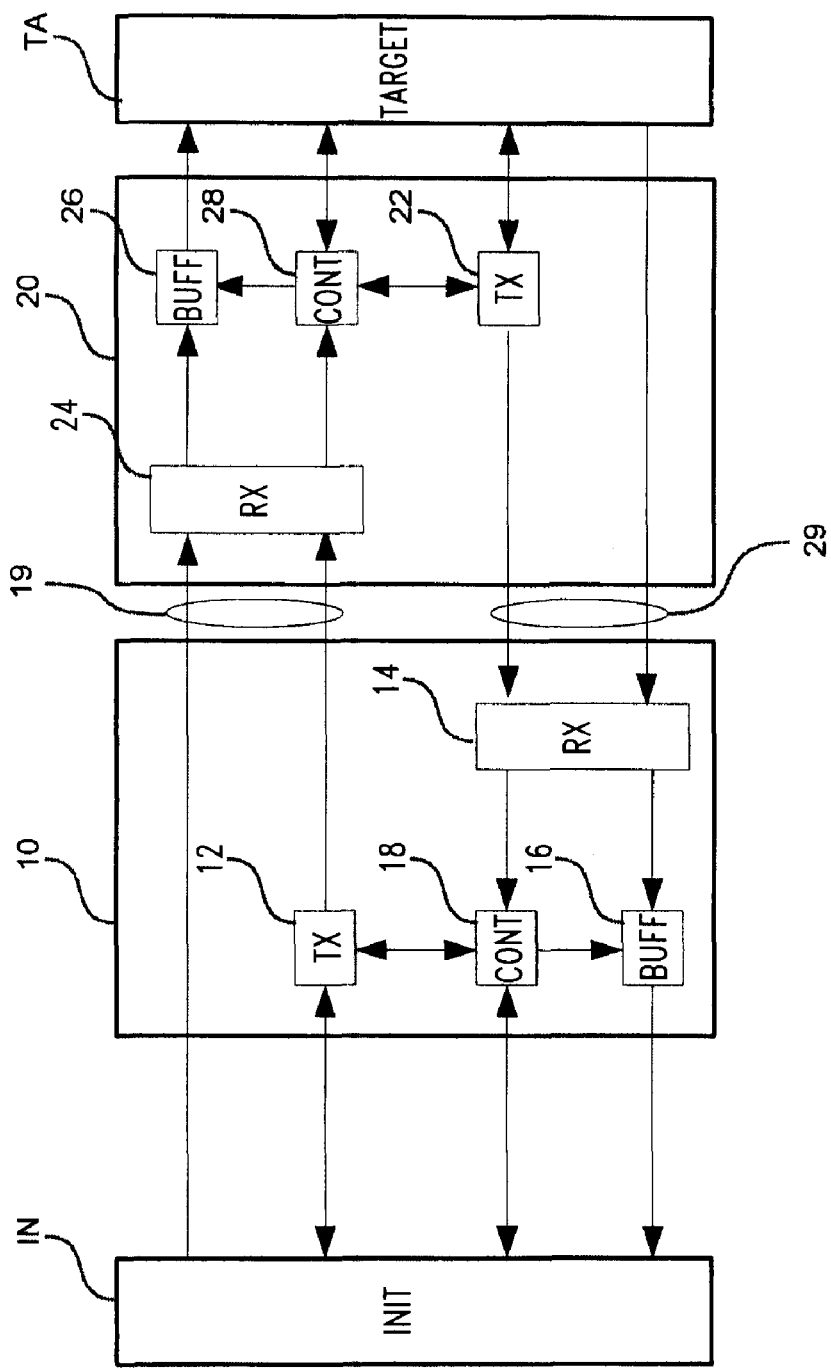
FIG. 5 is a top level view of a full-duplex mesochronous link of one embodiment.

FIG. 5 shows a schematic "top-level" view of a full-duplex mesochronous link according to one embodiment.

Specifically, the full-duplex mesochronous link of FIG. 5 is intended to operate between an initiator IN and a target TA, operating in respective clock domains, such as a initiator clock domain 10 and a target clock domain 20, wherein e.g., the target clock signal is a phase shifted version of the initiator clock signal.

Each of the initiator IN and the target TA is coupled to a transmitter module (TX) 12, 22 and a receiver module (RX) 14, 24 so that requests can be transmitted by the initiator IN and received by the target TA and responses transmitted by the target TA are received by the initiator IN.

In an embodiment, the transmitters 12, 22 and the receivers 14, 24 operate on the basis of the SKew Insensitive Link (SKIL) mechanism already mentioned in the foregoing.

Reference numerals 16, 26 indicate receiver buffers (e.g., 7-stage buffer structures) coupled to the receivers 14, 24. Finally, reference numerals 18, 28 indicate two control units that co-ordinate operation of the various modules/elements associated with the initiator IN and the target TA, respectively.

This arrangement leads to creating two "SKIL" links (i.e., a full-duplex SKIL link), typically in the form of buses, namely:

a first link 19 for the transmitter 12 coupled to the initiator IN to forward the requests towards the target TA in a mesochronous manner, and a second link 29 for the transmitter 22 coupled to the target TA to forward the responses towards the initiator IN, again in a mesochronous manner.

The full-duplex mesochronous link thus created provides an interface towards the data link layer (which can be at routers or NIs) and manage the SKIL physical layer through which information are actually propagated.

When combining two such links in a full-duplex mesochronous link, a problem arises in managing the flow control in that at the target side there is no immediate way to know if a request has been granted at the opposite end of the link. For the same reason, at the initiator interface there is no way to know if a response has been granted at the target side.

The arrangement described in the foregoing overcomes this difficulty by monitoring the request initiator flow control signals (init_req and init_ack) at the target interface and, vice versa, the response target flow control signals (targ_r_req and targ_r_gnt) at the initiator interface. This mechanism allows to know if a request (or a response) has been granted or not at the opposite link end.

This arrangement achieves maximum throughput and low-latency. It can be implemented through standard cells using a standard design flow; just two requirements are needed: clock signals are derived from the same source and interconnection delay is less than one clock period.

Unidirectional point-to-point links can thus be established with no clock skew constraints providing maximum throughput with latency up to two clock cycles. As better detailed in the following, operation is based on a particular mechanism which enables the communication between a transmitter (TX) and a receiver (RX) for any phase relationship between the two clock signals. Such a mechanism guarantees that no timing violations occur by assuring that RX reads data when they are stable.

Operation of the arrangement relies on a two-stage buffer structure that is written by the transmitter and read by the receiver. The transmitter provides a strobe signal as needed at the receiver side for writing data in the buffer, while the receiver includes the needed buffering capability, manages the mechanism to recover the synchronization at system start-up (through the strobe signal) and correctly reads data from the buffer.

Operation of such an arrangement can be divided into two phases, start-up and steady-state.

During the first phase, correct synchronization is recovered by using a synchronizer circuit and a proper initialization phase. No further synchronization is needed during steady-state operation, and there is the guarantee that no synchronization failures will occur. The start-up phase duration deterministically depends on the number of latches in the synchronizer. A policy for writing and reading data into and from the buffer in a "ping pong" fashion underlies steady-state operation.

In a typical operating scenario at the receiver side, the initial state is when both the buffer stages are empty and after synchronization has been performed. This policy guarantees that buffer reading always happens on stages where data are stable.

To implement operation as described, the transmitter (TX) blocks 12, 22 are configured in order to generate and propagate a signal req_ack along with the other data. This signal carries the information needed to know if the requests/responses have been granted or not at the opposite link end. In that way, each transmitter module 12 resp. 22, cooperating with the associated receiver module 24 resp. 14 implements the required mesochronous mechanism and also cooperates to implement a monitoring mechanism introduced in the previous section.

Figure 6:
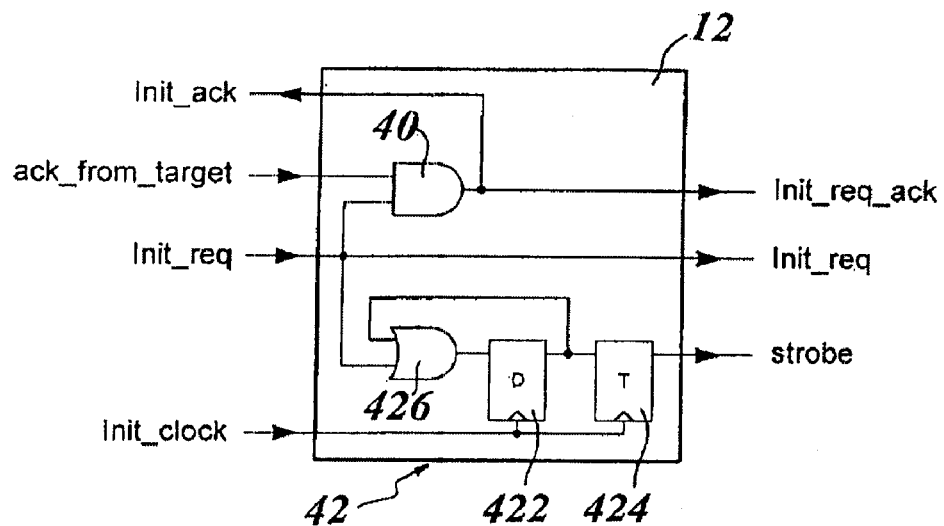
FIG. 6 is a block diagram schematics of a transmitter (TX) and interface of a full-duplex mesochronous link according to one embodiment.

FIG. 6 shows the TX schematic and interface related to the initiator IN according to one embodiment; it will be appreciated that, save for the possible different designation of the signals (e.g., "targ_" in the place of "init_"), the TX schematic and interface related to the target TA is essentially identical, thus making it unnecessary to provide an analogous description for the target side.

As shown in the schematics of FIG. 6, the TX block 12 uses both the ack_from_target signal (coming from the response mesochronous path 29 and provided by the control unit 28 at the opposite link end to acknowledge receipt of a request) and the init_req signal (coming from the initiator IN and indicating that a request has been sent to the target TA), to generate—usually as a simple logic product performing in an AND gate—two signals designated init_ack and init_req_ack.

The former of these (init_ack) is input to the initiator IN, while the latter (init_req_ack) is routed through the mesochronous request path 19 and reaches the control unit 28 at the opposite link end.

In addition to being fed to the AND gate 40, the init_req signal from the initiator IN is also forwarded to target TA and input to a strobe chain or register designated 42 as a whole.

The register 42 includes two cascaded edge-triggered flip-flops 422 (D) and 424 (T) clocked by the clock signal (here the initiator clock signal init_clock) plus an OR gate 426 whose inputs are fed with init_req signal from the initiator IN and the output signal from the flip-flop 422.

The strobe signal thus generated at the output of the chain 42 permits to latch data issued from the initiator IN (clocked by the initiator clock init_clock) and deliver them to the target TA (in synchronism with the target clock targ_clock).

Specifically, the register 42 is controlled by the initiator clock signal init_clock for delivering data to be transferred in synchronism with the clock signal. The register 42 generates a strobe signal having a frequency equal to half the frequency of the initiator clock signal init_clock.

As shown, the OR logical gate 426 receives as a first input the signal init_req as a trigger signal and as a second input the output of the (edge triggered) flip-flop 422.

Similarly, the "dual" transmitter 22 at the target side (not shown in detail, as indicated) will include an identical chain to generate a strobe signal to latch data issued from the target TA (clocked by the target clock targ_clock) and deliver them to the initiator IN (in synchronism with the initiator clock init_clock).

At the receiver side (i.e., the target TA for requests and the initiator IN for responses), both data and signals pass through the receiver module 24 resp. 14 and issue therefrom synchronized with the receiver clock.

The arrangement shown permits to achieve synchronization at system start-up, according to the following procedure.

The transmitter (either at the initiator or at the target, depending in whether requests or response are considered) sets the trigger signal for a number of clock cycles required by the synchronization system. The transmission synchronizer module is triggered and the strobe signal generation is started.

The synchronization reception module at the receiver (again, either the target or the initiator, depending in whether requests or response are considered) samples the incoming trigger signals and properly triggers a strobe signal generator. Once synchronization has been completed, the phase relationship between the strobe signals at the transmitter and at the receiver is continuously kept and timing of buffer operation is made.

The synchronizing mechanism just described puts the strobe signals at the transmitter and the receiver in phase relationship such that safe operation is guaranteed for both buffers 16 and 26, by ensuring assuring that the rising and falling edges of the strobe control signal at the receiver always occurs enough time after the rising and falling edges of the strobe control signal at the transmitter to latch stable data.

The phase relationship between those two signals which are generated synchronously to the transmitter and receiver clock signals, respectively, depends on the amount of skew between the respective clock signals. The possibility will exist in any case to identify a time window in where a rising edge of the receiver strobe control signal will always guarantee correct buffer operation.

Figure 7:
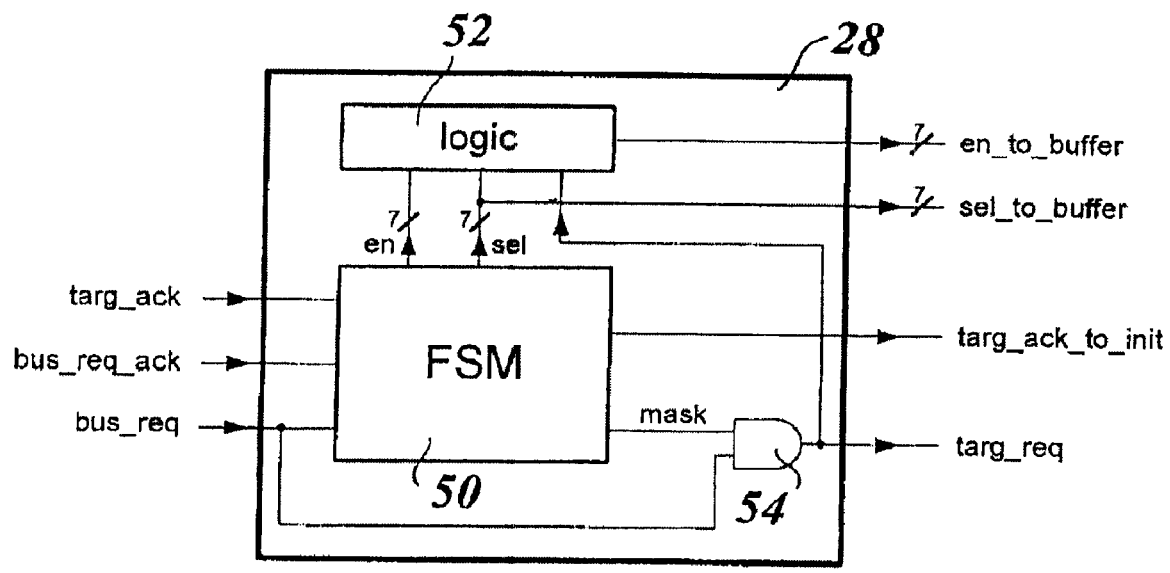
FIG. 7 is a block diagram representation of the architecture of a control unit of a full-duplex mesochronous link according to one embodiment.

FIG. 7 summarizes the architecture of the control unit 28 on the target side according to one embodiment. It will be appreciated that, save for the possible different designation of the signals, the control unit 18 is essentially identical, thus making it unnecessary to provide an analogous description for the initiator side.

Typically, the control unit 28 (resp. 18) includes a Finite State Machine (FSM) 50, a combinatorial circuit (logic network) 52 and an AND gate 54. This block is responsible for managing the buffer structure and the flow control with both the target request and the initiator response interfaces.

In FIG. 7, the signals with the prefix bus are the signals coming from the initiator side routed through the mesochronous request path 19. The signals en and sel generated by the FSM deal with the buffer driving, while the signals targ_req and targ_ack_to_init are the ones involved in the flow control.

The signals bus_rec_ack and bus_req are input to the FSM together with the acknowledgment message targ_ack from the target TA. The signal bus_req is also fed to one of the inputs of the AND gate 54.

The FSM generates two signals "en" and "sel" that are employed (in manner known per se, this point being of no specific momentum for the purposes of the present application) for driving the buffer 26 (resp. 16). This also applies to the structure and operation of the logic network 52 which are specific for the particular implementation adopted for the buffer: for instance, the buffer may be configured to support the possibility of moving a writing pointer and/or just one of the signals en and sel can be used.

As better detailed in the following in connection with FIG. 7, the FSM produces two signals, namely targ_ack_to_init and targ_req that are used for flow control purposes. In the embodiment shown, the signal targ_req is in fact produced as the logic product (performed in the AND gate 54) of the signal bus_req input to the FSM 50 and another signal, designated mask, produced by the FSM 50.

In the exemplary embodiment considered herein, the buffer 26 has a depth equal to 7 and, when empty, the buffer is bypassed thus providing direct connection to the target. Once again it is recalled that the details described in connection with modules associated with the target TA will generally apply also to the modules associated with the initiator.

Operation of the full-duplex mesochronous link 19, 29 is based on the concept of transferring request data and signals from the initiator (or master) to the target (or slave) and, vice versa, response data and signals from the target to the initiator with proviso that either side/end of the link is put in a position to learn—via an acknowledgment signal—when a request/response is granted at the opposite end, thus dispensing with a heavy throughput limitation. Essentially, in the arrangement described herein, the initiator and target are caused to operate in the basis of a request-acknowledgment (or valid-acknowledgment) signaling protocol.

In order to keep the two clock domains fully decoupled, those request data and signals that from the initiator have to reach the target are routed through the mesochronous request channel 19. For the same reason, those response data and signals that from the target have to reach initiator are routed through the mesochronous response channel 29.

In principle, in such an arrangement e.g., a request coming from the initiator could be sampled by the target more than on time: according to a generic req-ack protocol, after that the ack signal is asserted, if the req signal would remain asserted for more than one cycle, and the target might sample more than one request, with the result that the same request is sampled different times. Exactly the same problem might arise at the initiator side for the responses.

The arrangement described herein avoids this possible by making sure that, in order that a new request may reach the target, two events are needed to occur:
- the propagation of the ack through the mesochronous response channel 29, and
- the propagation of a new request (or the new r_req value) through the mesochronous request channel 19.

In a thoroughly symmetrical way, in order that a new response may reach the initiator, two events are needed to occur:
- the propagation of the ack through the mesochronous request channel 19, and
- the propagation of a new response (or the new resp value) through the mesochronous response channel 29.

Thanks to the mechanism for monitoring flow-control signals just described (which is implemented primarily via the init_req_ack signal), the possibility arises of ascertaining if a request reaching the target had been previously granted (init_ack=1) or not (init_ack=0) at the initiator interface.

In a typical embodiment, the two events mentioned in the foregoing represent necessary conditions to be met. In other embodiments, at the time instant where the signal bus_req at the input of the FSM 50 is equal to one, the request is construed as a "real" one if also the condition bus_req_ack=1 is met.

This mechanism is made possible because the initiator flow-control information is monitored at the target and, vice versa, the target flow-control information is monitored at the initiator.

In principle, this arrangement might turn out to be quite ineffective as it might heavily reduce the throughput (in order to transfer a flit, the round-trip latency has to be paid).

In the arrangement described herein this possible drawback is avoided in view of the buffering capability at both the target and initiator sides of the full-duplex link 19, 29 by properly managing flow-control signals. One embodiment of the flow-control managing policy also affects latency, thus optimizing performance in terms of both throughput and latency.

Specifically, the control units 28, 18 optimize latency by providing the acknowledgment even if the target is busy or there is no request coming from the initiator (e.g., at the initiator side the ack signal is masked with the req one by the TX unit).

As better detailed in the following in analyzing operation of the respective FSM, the control units 28, 18 de-assert their ack signals only in the situation in which the buffer could become full.

Figure 8:
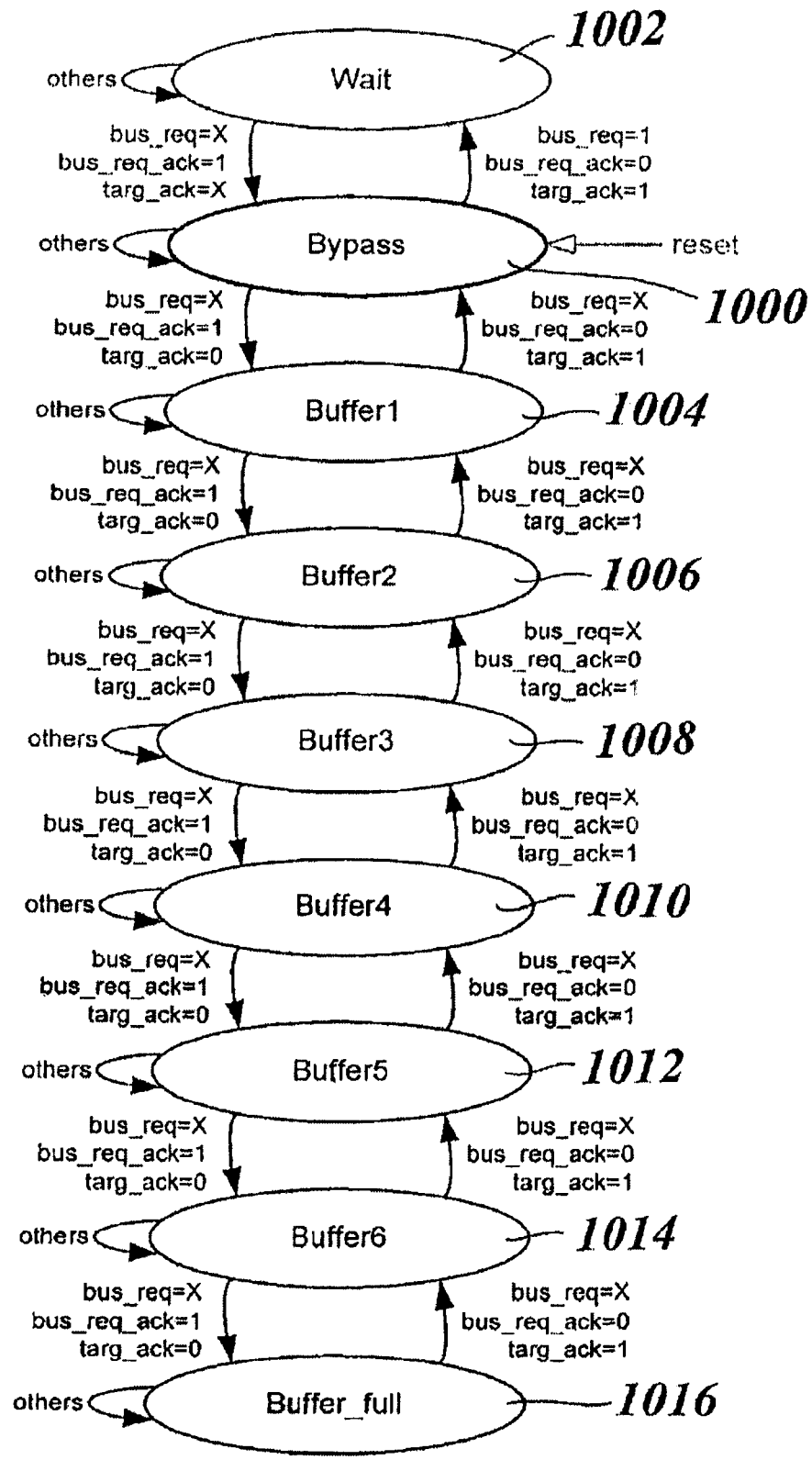
FIG. 8 is an example transition state diagram of a Finite State Machine (FSM) associated with a full-duplex mesochronous link according to one embodiment.

An example transition state diagram for the FSM 50 in the control unit 28 according to one embodiment is shown in FIG. 8.

The meaning of each state and the actions performed are discussed in the following.

The Bypass state (1000 in FIG. 8) is the reset state. Here the first buffer location is enabled and the buffer is bypassed. Therefore, data coming from the receiver RX are forwarded to the target TA and, at the same time, written into the first buffer location.

The signal designated "mask" is set to 1 in order to enable the bus_req signal to reach the target. The targ_ack_to_init signal is also set to 1: this is because in this state the buffer is empty and the requests can be granted at the initiator side even if the target cannot accept them.

When a request not granted comes (bus_req=1 and bus_req_ack=0):
- if the target TA gives the acknowledgment (targ_ack=1) the next state will be Wait (1002 in FIG. 8);
- if the target TA does not give the acknowledgment the next state will be still Bypass (i.e., 1000).

When a granted request comes:
- if the target 20 does not give the acknowledgment, the next state will be Buffer1 (1004 in FIG. 8): here the buffer signals are driven to increment the buffer pointer and properly manage the flow control;
- if the target gives the acknowledgment the next state remains Bypass (i.e., 1000).

For all the other cases the next state will remain Bypass (i.e., 1000).

In the Wait state 1002, the situation is the same of the Bypass state except for the signal mask that is forced to 0 in order to avoid the target grants the same request at different times.

In brief, in the Wait state 1002:
- the target TA is available to accept a request;
- the request on the bus (at the RX output) has not been granted at the initiator side;
- the request in input to the target is forced to 0 by means of the mask signal;
- the targ_ack_to_init signal is set to 1 because the buffer is empty and the requests can be granted at the initiator.

When the bus_req_ack signal goes to 1, the FSM 50 will come back in the Bypass state (i.e., 1000), otherwise the next state will be still Wait (i.e., 1002).

The designation BufferX (X=1, 2, 3, 4, 5, 6) denotes a set of states designated 1004 to 1014 in FIG. 8.

When the FSM 50 goes to any of the states Buffer1, Buffer2, Buffer3, Buffer4, Buffer5 or Buffer6, the buffer pointer is incremented, the mask signal is set to 1 and the targ_ack_to_init signal is forced to 0.

This behavior guarantees that subsequent requests are stored (into the buffer) even if the target does not grant them. In the worst case, from the time in which the target close the communication (targ_ack=0), seven requests will be received at the target side and the buffer will be saturated with no losses.

In any of the BufferX states, when a granted request comes:
- if the target TA does not give the acknowledgment, the next state will be BufferX+1;
- if the target tA gives the acknowledgment the next state remains BufferX.

When there is no request on the bus (bus_req_ack=0: if there is a request, it surely has been granted at the initiator side):
- if the target does not give the acknowledgment, the next state will remain BufferX;
- if the target gives the acknowledgment the next state remains BufferX−1.

When the FSM 50 is in the Buffer_full state (1016 in FIG. 5) the buffer is full and there is the guarantee that no additional requests will come from the bus.

Here the behavior is the same as previously described in connection with the BufferX states except for the fact that only the transitions with the Buffer6 state are possible.

The full-duplex mesochronous link, even though supporting an initiator clock signal and a target clock signal, requires that the clock signals derive from the same clock source but might have different phase.

In an embodiment, this full-duplex mesochronous link is extended by adding synchronization FIFO memories in order to support completely different clock domains.

As can be seen from the foregoing the control units 18 and 28 in connection with the buffers 16 and 26 operate similar to a FIFO memory. In this embodiment this behavior is used to replace at least one of the buffers 16 or 26 of the full-duplex mesochronous link by a synchronization FIFO memory with associated control circuitry.

Figure 9:
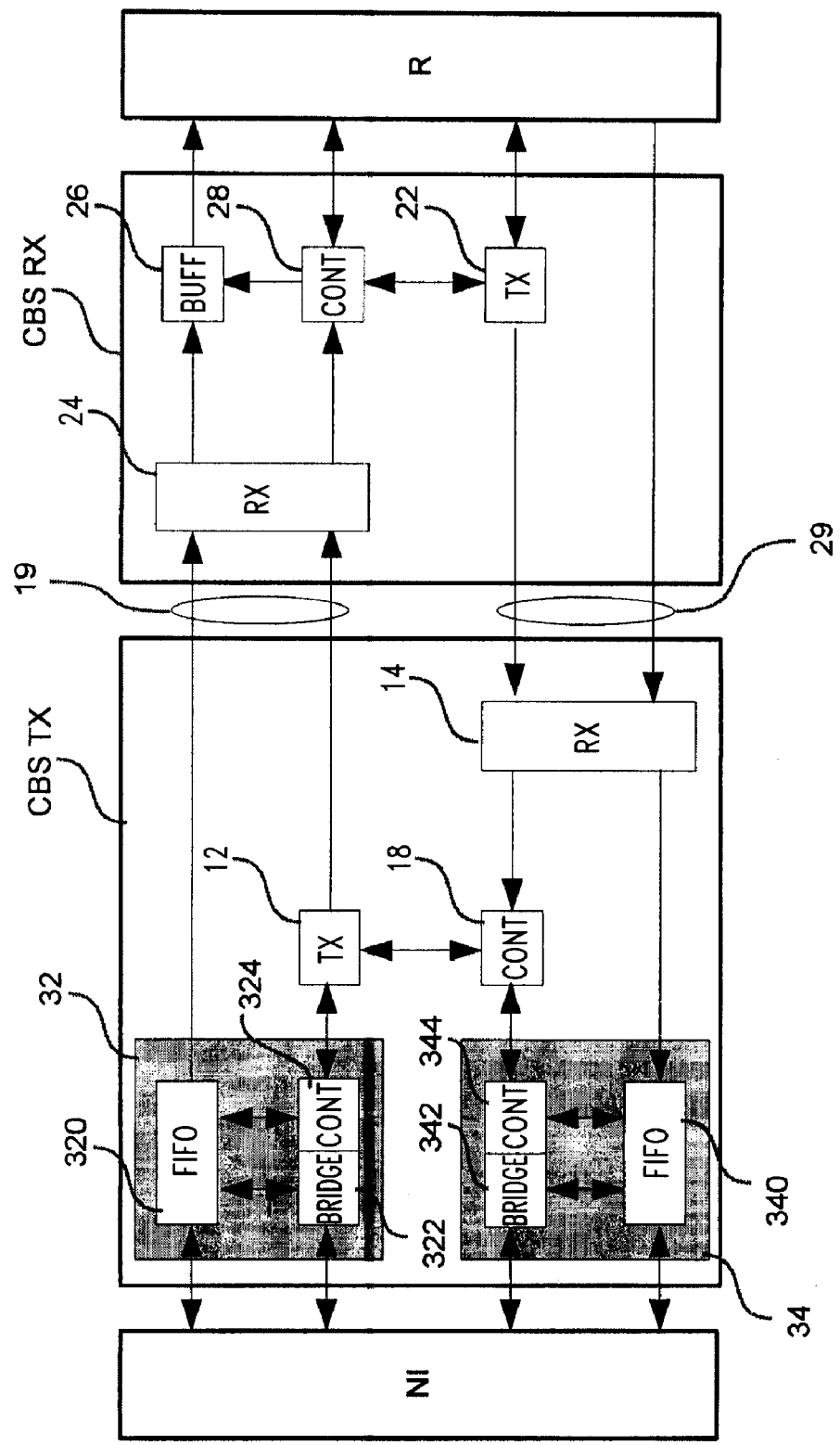
FIG. 9 is a top level view of a full-duplex mesochronous link with the capability of handling multiple clock domains according to one embodiment.

In the embodiment shown in FIG. 9, a first synchronization block 32 has been added "upstream" of the SKILL TX module 12, and the buffer 16 arranged "downstream" of the SKILL RX module 14 has been replaced by a second synchronization block 34, Specifically, the first synchronization block 32 comprises a FIFO memory 320, a frequency bridge 322 and a control unit 324. Similarly, the second synchronization block 34 comprises a FIFO memory 340, a frequency bridge 342 and a control unit 344.

In an embodiment, the frequency bridge 322 and the control unit 324 implement a first FIFO memory control circuit for the FIFO memory 320 as shown in FIG. 2. Similarly, the frequency bridge 342 and the control unit 344 implement a second FIFO memory control circuit for the FIFO memory 340. In this embodiment, each of the frequency bridges 322 and 422 would implement the synchronization chains 226 and 246.

In one embodiment, the NI writes data to the first FIFO 320 with the first clock signal, i.e., the IP clock signal. If data are available in the FIFO 320, the control unit 324 generates the related FIFO read signals and the control signals for the TX module 12 in order to send data over the mesochronous link 19.

Specifically, the frequency conversion provided by the frequency bridge 322, permits to read the FIFO with the second clock signal (i.e., the NoC clock signal) before crossing the clock boundary by means of the SKIL mesochronous link 19.

The FIFO read by SKIL is the same FIFO used for the synchronization. The information is now stored in the buffer modules 26 of the CBS RX module with the second clock signal, where, according with the system requirements, a "store and forward" policy can be applied to prevent possible bubbles or segmentation introduced by the double frequency conversion. This store and forward mechanism can be implemented by reusing the same buffer required for the implementation of the mesochronous mechanism.

Symmetrically, in the response flow, the FIFO memory 340 reached by the SKIL RX receiver 14 is reused for the asynchronous communication through the frequency bridge 342.

Specifically, the control unit 344 converts the control signals coming from the control unit 18 in order to write a response to the FIFO 340 in the CBS TX module with the unbalanced clock signal coming from the CBS RX module (i.e., the NoC Clock signal). This data can then be read from the CBS TX module with the first clock signal (i.e., the IP clock signal).

The operation of the control unit 18 and the control unit 344 of one embodiment might be united and only a single control unit might be used which creates directly the related FIFO write signals.

The proposed solution ensures that the FIFO memories 320 and 340 are written and read in the same cluster, such as for high frequency SoCs.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

Without prejudice to the underlying principles, the details and the embodiments may vary, even appreciably, with reference to what has been described by way of example only, without departing from the scope as defined by the annexed claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A communication system, comprising:
a first communication channel configured to couple an initiator operating with an initiator clock to a target operating with a target clock, the first communication channel including:
   means for storing data from the initiator in a first FIFO memory with said initiator clock;
   means for reading data from the initiator stored in said first FIFO memory, wherein said reading is with said target clock;
   means for transmitting said data read from said first FIFO memory over a first mesochronous link, the means for transmitting said data read from said first FIFO memory having:
      a first logic gate having a first terminal to receive a target acknowledgement signal via a second mesochronous link from said target, having a second terminal to receive a request signal from said initiator, and a third terminal to provide first and second acknowledgement signals;
      a second logic gate coupled to said first logic gate and having a first terminal to receive said request signal, a second terminal, and a third terminal; and
      first and second flip-flops each clocked by said initiator clock, said first flip flop having a first terminal coupled to said third terminal of said second logic gate and having a second terminal coupled to said second terminal of said second logic gate, said second flip flop having a first terminal coupled to said second terminal of said first flip flop and having a second terminal to provide a strobe signal; and
   means for storing said data transmitted over said first mesochronous link in a buffer, wherein said data are made available to the target; and
a second communication channel configured to couple said target to said initiator, the second communication channel including:
   means for transmitting data from said target over the second mesochronous link; and means for storing said data transmitted over said second mesochronous link in a second FIFO memory, wherein said storing is with said target clock, wherein said data are made available to said initiator for reading from said second FIFO memory with said initiator clock signal.

2. The system of claim 1, further comprising said initiator and wherein said initiator is configured to perform said storing data from the initiator in said first FIFO memory, reading data from the initiator stored in said first FIFO memory, transmitting said data read from said first FIFO memory over said first mesochronous link, and storing said data transmitted over said second mesochronous link in said second FIFO memory.

3. The system of claim 1, further comprising said target and wherein said target is configured to perform said storing said data transmitted over said first mesochronous link in said buffer, and said transmitting data from said target over said second mesochronous link.

4. An apparatus, comprising:
a first communication channel configured to couple an initiator clocked by an initiator clock to a target clocked by a target clock, the first communication channel including:
a first memory adapted to store data from said initiator according to said initiator clock;
a controller coupled to said memory and adapted to read, according to said target clock, said data from the initiator stored in said first memory; and
a transmitter coupled to said controller and adapted to transmit said data read from said first memory over a first mesochronous link, the transmitter having:
a first logic gate having a first terminal configured to receive a target acknowledgement signal via a second mesochronous link from said target, having a second terminal configured to receive a request signal from said initiator, and a third terminal configured to provide first and second acknowledgement signals;
a second logic gate coupled to said first logic gate and having a first terminal to receive said request signal, a second terminal, and a third terminal; and
first and second flip-flops each clocked by said initiator clock, said first flip flop having a first terminal coupled to said third terminal of said second logic gate and having a second terminal coupled to said second terminal of said second logic gate, said second flip flop having a first terminal coupled to said second terminal of said first flip flop and having a second terminal to provide a strobe signal; and
a second communication channel configured to couple said target to said initiator, the second communication channel including:
a receiver adapted to receive data from said target over the second mesochronous link; and
a second memory coupled to said receiver and adapted to store, according to said target clock, said data received over said second mesochronous link, wherein said stored data are made available to be read by said initiator from said second memory according to said initiator clock signal.

5. The apparatus of claim 4 wherein said first and second memories include FIFO memories.

6. The apparatus of claim 4, further comprising at least one bridge coupled to said first and second memories and adapted to operate as a synchronization chain.

7. The apparatus of claim 4 wherein said controller includes:
a finite state machine adapted to provide buffer driving;
a combinatorial logic circuit coupled to said state machine; and
a logic gate coupled to said finite state machine and to said combinatorial logic circuit, and adapted to provide a flow control signal.

8. The apparatus of claim 4 wherein said link is part of a Network-on-Chip (NoC) arrangement and at least one of said initiator and said target is a network interface (NI) of an intellectual property (IP) module in said Network-on-Chip arrangement.

9. The apparatus of claim 4 wherein said link is part of a Network-on-Chip (NoC) arrangement and at least one of said initiator and said target is a router in said Network-on-Chip arrangement.

* * * * *